Feb. 1, 1949.  J. A. PETHO  2,460,361
SLIPPER BEARING
Filed Sept. 22, 1943
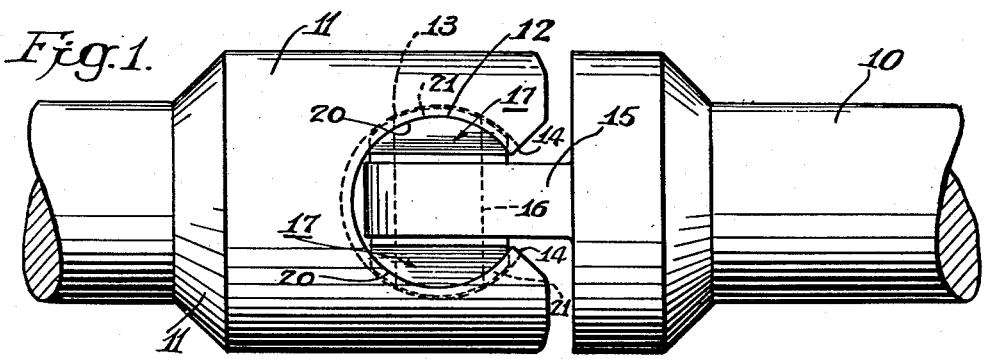
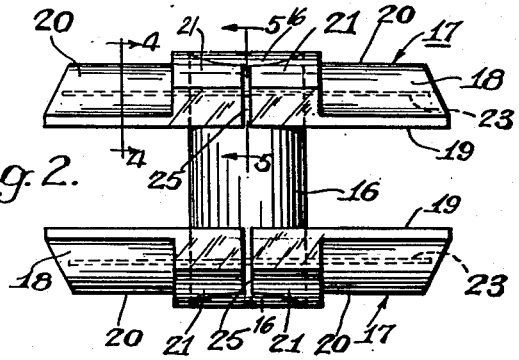
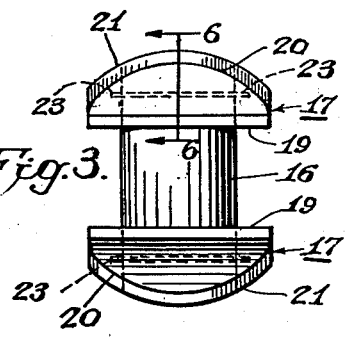
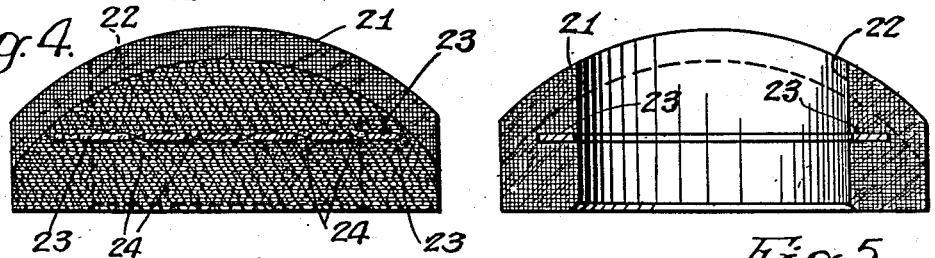
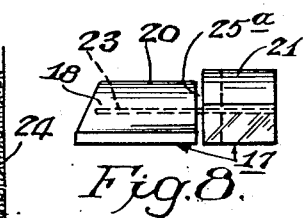
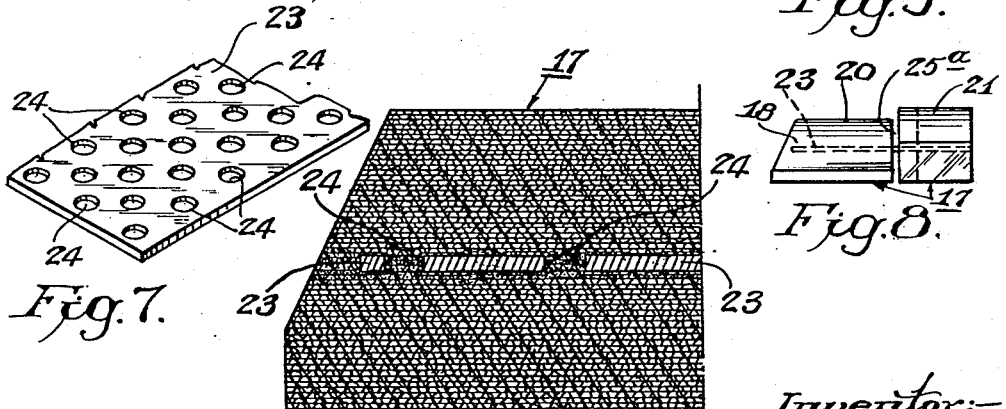
Inventor:—
John A. Petho
by his Attorneys
Howson + Howson Patented Feb. 1, 1949

2,460,361

UNITED STATES PATENT OFFICE 2,460,361

SLIPPER BEARING

John A. Petho, Perkiomenville, Pa., assignor to Continental-Diamond Fibre Company, Newark, Del., a corporation of Delaware Application September 22, 1943, Serial No. 503,431

6 Claims. (Cl. 64—7)

This invention relates to slipper bearings for use in universal couplings and more particularly to the construction of heavy-duty slipper bearings, such as are utilized in rolling mills and discussed in the patent to T. L. Gatke, issued July 31, 1940, for Molded composition slipper bearing, No. 2,251,126. Such bearings are usually constructed of a plurality of superposed sheets of fabric impregnated with and adhered together by a heat-hardened, infusible, insoluble resinous material, for example, a phenolic resin, such as the usual phenol-formaldehyde resin. As a substitute for the fabric sheets, chopped or macerated, canvas, duck or other cellulosic fibrous material may be used as a filler in the bearing. Such a bearing provides a hard, resilient smooth bearing surface, admirably adapted for use where a structure is required which will stand up under hard treatment.

While it has heretofore been proposed to utilize a molded composition of this type in the construction of such bearings and while such bearings are superior to the ordinary metallic bearing heretofore employed, being more silent and of greater durability, previous bearings of this type have been objectionable in that they tend to break down under the pounding to which they are subjected and, more particularly, to rupture at the center thereof which is constantly flexed as a result of the strain placed thereon by the connecting pin and of the inherent rigidity of the molded composition body.

An important object of the present invention is the elimination, to the greatest possible extent, of the internal strains normally set up in the body of the bearing by forming such bearings in a plurality of sections connected together by a resilient element incorporated in the bearing in the process of manufacturing the same.

A further and more specific object of the invention is the provision of a bearing of this type which is formed of a plurality of sections which are connected by means of a flexible steel plate embedded in the body of the bearing, such plate being perforated, slotted or otherwise constructed so that the portions of the bearing sections lying at opposite sides of the plate may be adequately joined to the plate and to one another in the ordinary process of manufacturing.

These and other objects I attain by the constructions illustrated in the accompanying drawings wherein:

Fig. 1 is a plan view of a rolling mill roll coupling incorporating a bearing constructed in accordance with my invention;

Fig. 2 is a side elevation of the bearing;

Fig. 3 is an end elevation thereof;

Fig. 4 is a section on line 4—4 of Fig. 2;

Fig. 5 is a section on line 5—5 of Fig. 2;

Fig. 6 is a section on line 6—6 of Fig. 3;

Fig. 7 is a fragmentary perspective of a typical connecting plate of the type employed; and Fig. 8 is a fragmentary side elevation of a modified type of bearing.

Referring now more particularly to the drawings, numerals 10 and 11 indicate respectively the male and female elements of a universal joint embodying a slipper bearing constructed in accordance with my invention. The female element has formed therein adjacent its end, a bore 12, the central portion of which is preferably enlarged at 13. This bore communicates with a notch 14 in the outer end of the female element through which the tang 15 of the male element extends for engagement with the center pin or block 16 with which the bearing elements 17, under particular discussion, are engaged.

The elements 17 are identical in construction, each comprising a composite molded body 18, chordally segmental in cross-section, having a flat inner face 19 and an arcuately curved outer face 20 fitting the bore 12. In the present construction, each element 17 has a central enlargement 21 engaging in and fitting within the bore 13 to prevent excessive displacement of the bearing in a direction axial to the bore. At this relatively thickened portion, the elements 17 are each formed with an aperture 22 for the reception of the ends of the center pin 16. Embedded in the molded body, which may be conveniently formed of any of the materials hereinbefore noted, is a steel plate 23, this plate being arranged adjacent to and parallel to the flat surface of the bearing element and having apertures 24 formed therein. These apertures will permit the impregnated material and/or the impregnating resinous composition and fabric pieces on opposite sides of the plate to be interlocked in or through the apertures of the plate, thus insuring integrity of the two portions of the bearing at opposite surfaces of the plate. Additionally, the plate itself is made of less width and length than the over-all width and length of the bearing element so that the body material of the bearing element may be bonded together about the edges thereof.

Following formation or during formation of the bearing, it is slotted, as indicated at 25 both above and below the plate 23 or substantially to the surface of this plate, and the element 17 is transversely slotted, thus becoming a plurality of sections which are maintained in assembled relation by the flexible plate. The slots may be, and preferably are, formed centrally of the element, but, if so desired, may be made at either side of the enlargement 22, as indicated at 25a in Fig. 8.

By adopting a construction of this character, strains resulting from "hammering" of the bearing due to angular displacement of the male and female elements of the coupling, may be substantially reduced, the spring plate permitting the sections of the bearing to adapt themselves to the changing angularity ordinarily producing such "hammering" and being particularly effective when wear upon the bearing has increased the bearing strains. It may, additionally, be pointed out that a molded composition bearing incorporating a spring plate of this type, even though not formed in sections, is a substantial improvement over the ordinary molded bearing. While we have above referred specifically only to the use of phenolic resins, it will be understood that any plastic composition of that type may be utilized, heat-hardening resinous materials as a class being especially suitable for use.

Since the construction illustrated is capable of considerable modification, without departing from the spirit of my invention, I do not wish to be understood as limiting myself to the particular construction hereinbefore mentioned, except as hereinafter claimed.

I claim:

1. A slipper bearing composed of a cellulosic base impregnated with a heat-hardening resinous material, said bearing being chordally segmental in cross section and having a unitary flat flexible metal plate substantially co-extensive therewith embedded therein parallel to the flat face thereof, the bearing being transversely slotted to sever the same at opposite faces of said plate.

2. A slipper bearing chordally segmental in cross section, said bearing comprising a plurality of longitudinally spaced sections and a porous flat flexible member of slightly smaller dimensions than the flat face of the bearing paralleling said flat face and embedded in and connecting said sections, said sections being each composed of a base material impregnated with a heat-hardening resinous composition.

3. A slipper bearing comprising a plurality of longitudinally spaced sections and a flexible member connecting said sections, said sections being each chordally segmental and composed of cellulosic material impregnated with a heat-hardening resinous material, said flexible member comprising a unitary flat metal plate having a length substantially equal to that of the combined lengths of the sections and having portions thereof embedded in each of the sections, the bearing being free from exposed metal at its working surfaces.

4. A slipper bearing composed of a cellulosic base impregnated with a heat-hardening resinous material, said bearing being chordally segmental in cross section and having a unitary flat flexible perforated metal plate substantially co-extensive therewith and embedded therein parallel to the flat face thereof, the bearing being transversely slotted to sever the same at opposite faces of said plate, the material of the bearing being bonded through the plate and about the edges thereof.

5. A slipper bearing chordally segmental in cross section, said bearing comprising a plurality of longitudinally spaced sections and a porous flat flexible member of slightly smaller dimensions than the flat face of the bearing paralleling said flat face and embedded in and connecting said sections, said sections being each composed of a base material impregnated with a heat-hardening resinous composition, said material being free from exposure at the working faces of the bearing.

6. A slipper bearing comprising a plurality of longitudinally spaced sections and a flexible member connecting said sections, said sections being each chordally segmental and composed of cellulosic material impregnated with a heat-hardening resinous material, said flexible member comprising a unitary flat metal plate parallel with the flat faces of the sections having a length substantially equal to that of the combined lengths of the sections and having portions thereof embedded in each of the sections, the bearing being free from exposed metal at its working surfaces.

JOHN A. PETHO.

REFERENCES CITED

The following references are of record in the file of this patent:

UNITED STATES PATENTS

| Number | Name | Date |
| --- | --- | --- |
| 1,160,364 | Baekeland | Nov. 16, 1915 |
| 2,251,126 | Gatke | July 29, 1941 |
| 2,305,698 | Irvin | Dec. 22, 1942 |
| 2,305,701 | Irvin | Dec. 22, 1942 |
| 2,361,629 | Irvin | Oct. 31, 1944 |